(12) United States Patent
Ishikawa et al.

(10) Patent No.: US 7,023,827 B2
(45) Date of Patent: Apr. 4, 2006

(54) WAP ANALYZER

(75) Inventors: Akio Ishikawa, Tokyo (JP); Osamu Maeshima, Tokyo (JP); Akira Idoue, Saitama (JP); Toshihiko Kato, Saitama (JP)

(73) Assignee: KDDI Corporation, Tokyo (JP)

( * ) Notice: Subject to any disclaimer, the term of this patent is extended or adjusted under 35 U.S.C. 154(b) by 962 days.

(21) Appl. No.: 09/949,784

(22) Filed: Sep. 12, 2001

(65) Prior Publication Data

US 2002/0089961 A1    Jul. 11, 2002

(30) Foreign Application Priority Data

Sep. 13, 2000  (JP)  ............................. 2000-277919
Sep. 13, 2000  (JP)  ............................. 2000-277920

(51) Int. Cl.
*H04Q 7/28*    (2006.01)

(52) U.S. Cl. ........................ 370/338; 370/401; 455/466

(58) Field of Classification Search ................ 370/338, 370/401, 466, 392, 314, 349; 455/466, 67.11
See application file for complete search history.

(56) References Cited

U.S. PATENT DOCUMENTS

| | | | | |
|---|---|---|---|---|
| 6,259,905 B1 * | 7/2001 | Berkowitz et al. | .......... | 455/401 |
| 6,359,901 B1 * | 3/2002 | Todd et al. | .................. | 370/465 |
| 6,490,291 B1 * | 12/2002 | Lee et al. | ..................... | 370/401 |
| 6,522,635 B1 * | 2/2003 | Bedwell | ...................... | 370/314 |
| 6,539,384 B1 * | 3/2003 | Zellner et al. | ................ | 707/10 |
| 6,754,200 B1 * | 6/2004 | Nishimura et al. | .......... | 370/349 |
| 6,771,975 B1 * | 8/2004 | Shin | ........................... | 455/466 |
| 6,772,952 B1 * | 8/2004 | Macaire | ...................... | 235/492 |
| 6,775,291 B1 * | 8/2004 | Ryu et al. | .................... | 370/401 |
| 2003/0093406 A1 * | 5/2003 | Zellner et al. | ................ | 707/1 |

* cited by examiner

*Primary Examiner*—Wellington Chin
*Assistant Examiner*—Binh Q Nguyen
(74) *Attorney, Agent, or Firm*—Armstrong, Kratz, Quintos, Hanson & Brooks, LLP

(57) ABSTRACT

A WAP (Wireless Application Protocol) analyzer located on a transmission line between communication apparatuses using WAP. A WAP packet includes at least one WTP-PDU (Wireless Transaction Protocol—Protocol Data Unit). The WAP analyzer comprising, database (16) for storing state-transition specification data that define a state-transition with a cause-and-effect relationship between WTP-PDUs, states of a WTP layer, primitives between the WTP layer and WSP (Wireless Session Protocol) layer, and states of the WSP layer, based on WAP specification, means (11) for extracting the WTP-PDUs from the WAP packets, and means (13) for estimating the state-transition of the WTP layer and the WSP layer, to the apparatus that received one of the WTP-PDUs and subsequently sent other of the WTP-PDUs, for each pair of a sender and a receiver.

9 Claims, 11 Drawing Sheets

STATE-TRANSITION DIAGRAM
OF SERVER'S WSP LAYER

STATE-TRANSITION DIAGRAM OF INITIATOR'S WTP LAYER

STATE-TRANSITION DIAGRAM OF RESPONDER'S WTP LAYER

WAP ANALYZER

FIELD OF THE INVENTION

The present invention relates to a WAP (Wireless Application Protocol) analyzer for analyzing WAP that is a protocol for wireless data communication.

DESCRIPTION OF THE RELATED ART

In a mobile data communication service using cellular phones, a WAP is used on an Internet connection service. When providing such service, the operator thereof is requested to monitor packets flowing through the network so as to find its throughput falling.

Conventionally, a protocol analyzer was used for monitoring the packets. When using this conventional protocol analyzer, the operator itself had to analyze a PDU (Protocol Data Unit) format to know an event generated in communication apparatuses located at both ends. This is because the conventional protocol analyzer cannot display the analyzed results based upon the communication procedure of WAP. Furthermore, in order to analyze the state-transition of WAP, it was necessary that the operator knew the states of a WTP (Wireless Transaction Protocol) layer, the primitives generated between the WTP layer and a WSP (Wireless Session Protocol) layer, and the states of the WSP layer, based on the PDUs. However, such analysis was very difficult for the operator particularly when a data error or a retransmission occurred.

Furthermore, according to the conventional protocol analyzer, even if a specific layer of WAP could be analyzed, the relationship between this specific layer and its higher-order or lower-order layer could not be analyzed. This is because, when the higher-order layer protocol on a packet was analyzed, necessary information of the lower-order layer protocol on the packet was abandoned.

Since the transmission state of the lower-order layer protocol considerably affects the transmission state of the higher-order layer protocol, it is very effective to analyze the cause-and-effect relationship between one primitive on the higher-order layer and a plurality of packets on the lower-order layer. In particular, in order to grasp the transmission state of WAP, it is necessary to execute the analysis based on a cause-and-effect relationship between one session of WSP and a plurality of transactions of WTP.

SUMMARY OF THE INVENTION

It is therefore an object of the present invention to provide a WAP analyzer which can easily analyze the state-transition of WAP based on monitored communicating PDUs.

The present invention concerns a WAP analyzer located on a transmission line between communication apparatuses using WAP. A WAP packet includes at least one WTP-PDUs. According to the present invention, particularly, the WAP analyzer comprising, database for storing state-transition specification data that define a state-transition with a cause-and-effect relationship between WTP-PDUs, states of a WTP layer, primitives between the WTP layer and WSP (Wireless Session Protocol) layer, and states of the WSP layer, based on WAP specification, means for extracting the WTP-PDUs from the WAP packets, and means for estimating the state-transition of the WTP layer and the WSP layer, to the apparatus that received one of the WTP-PDUs and subsequently sent other of the WTP-PDUs, for each pair of a sender and a receiver.

It is preferred that the estimating means estimates the state-transition in the apparatus that sent the one WTP-PDU in an initial state.

It is preferred that the estimating means estimates the state-transition in the apparatus that sent or received the one WTP-PDU, when a predetermined time-out is generated.

It is preferred that the WAP analyzer further comprises means for displaying the state-transition in time series.

It is preferred that the WAP analyzer further comprises means for storing a log of the WTP-PDUs extracted on real time in an online state by the extracting means, and wherein the estimating means processes in an offline state using a plurality of WTP-PDUs stored in the log storing means.

It is preferred that the WAP analyzer further comprises means for storing a statistical-information including a WTP statistical-information table and a WSP statistical-information table for each pair of send sender and the receiver, and wherein the estimating means for incrementing the number of item of WTP statistical-information table and of WSP statistical-information table, in a case that the WAP packets corresponds to the item.

It is preferred that the items of the WTP statistical-information table include the number of PDUs, the number of bytes, the number of transactions, the distributed number of PDUs per transaction, the number of retransmission PDUs per transaction, the number of retransmission bytes, the number of retransmission PDUs per transaction and the distributed number of retransmission bytes per transaction, and wherein items of the WSP statistical-information table include the number of sessions, the distributed number of transactions per session, the number of PDUs per session, and the distributed number of bytes per session.

It is preferred that the displaying means displays the items and the numbers of the items in the WTP statistical-information table and the WSP statistical-information table.

It is preferred that the displaying means displays an average number of PDUs per transaction, an average number of bytes per transaction, an average number of retransmission PDUs per transaction, an average number of retransmission bytes per transaction, an average number of transactions per session, an average number of PDUs per session, and an average number of bytes per session.

Further objects and advantages of the present invention will be apparent from the following description of the preferred embodiments of the invention as illustrated in the accompanying drawings.

DESCRIPTION OF THE PREFERRED EMBODIMENTS

Figure 1:
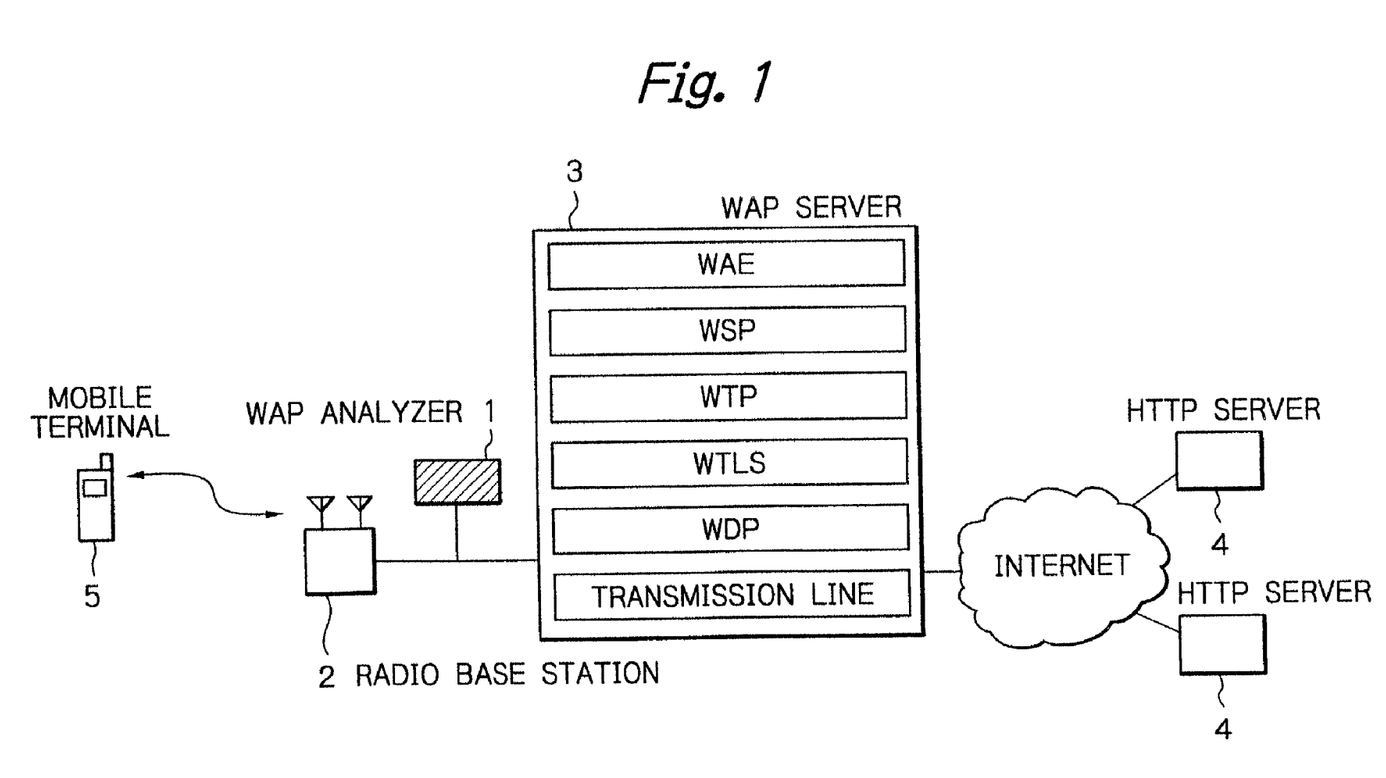
FIG. 1 shows a block diagram schematically illustrating a data communication system with a WAP analyzer according to the present invention.

FIG. 1 schematically illustrates a data communication system with a WAP analyzer. A mobile terminal 5 using WAP communicates with a WAP server 3 through a radio base station 2. The WAP server 3 communicates with a HTTP server 4 through the Internet. The WAP server 3 provides a protocol translation function between WAP and HTTP. Generally, the WAP analyzer 1 is mounted on a transmission line between the radio base station 2 and the WAP server 3. Thus, the WAP analyzer 1 can get PDUs of communicated packets.

A WAP architecture consists of following layers:
WAE (Wireless Application Environment),
WSP (Wireless Session Protocol),
WTP (Wireless Transaction Protocol),
WTLS (Wireless Transport Layer Security), and
WDP (Wireless Datagram Protocol).

The WAP analyzer according to the present invention analyzes the WTP layer and the WSP layer.

Figure 2:
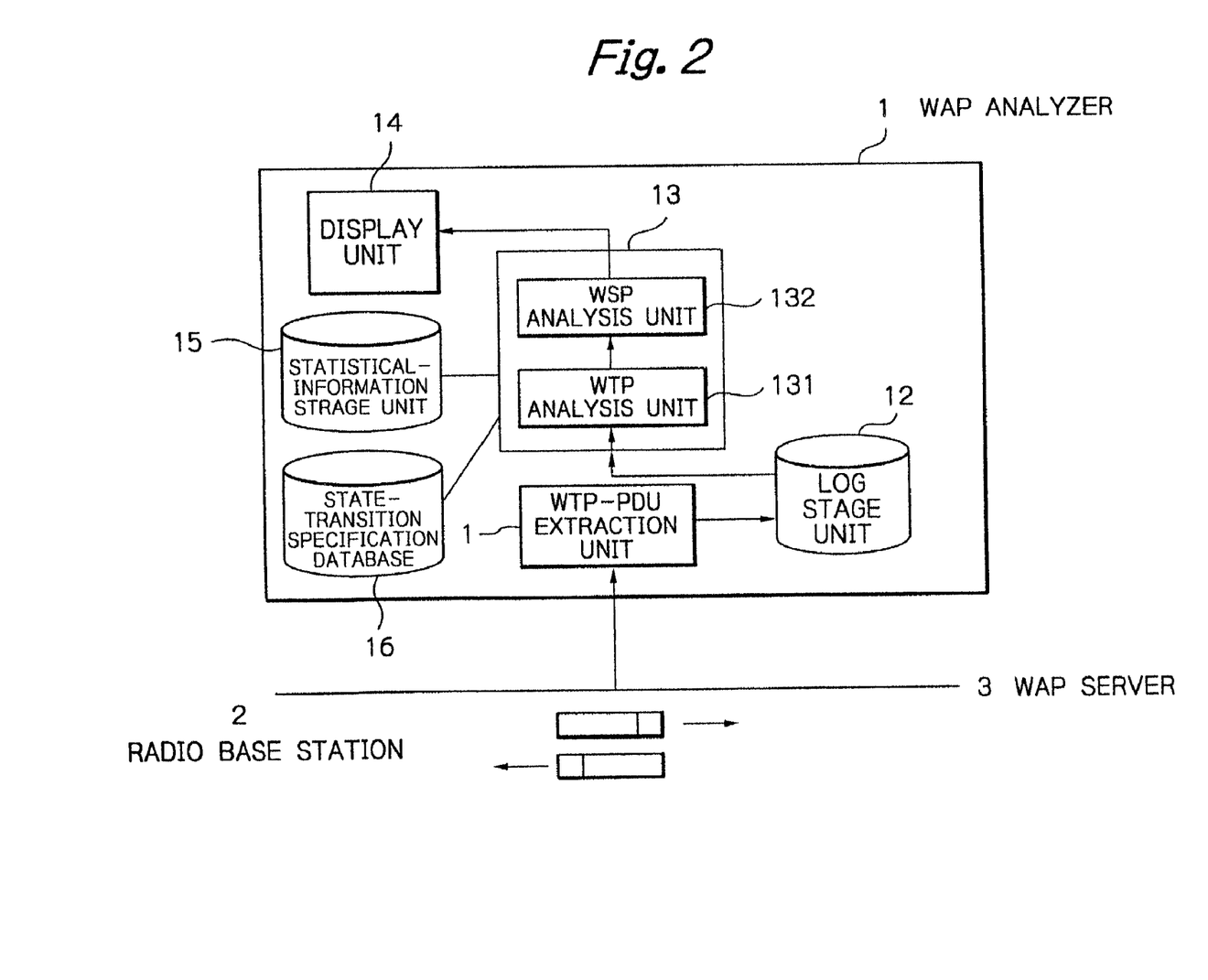
FIG. 2 shows a functional block diagram schematically illustrating the WAP analyzer as a preferred embodiment according to the present invention.

FIG. 2 schematically illustrates the WAP analyzer as a preferred embodiment according to the present invention. Each functional unit of this WAP analyzer will be explained hereinafter.

A WTP-PDU extraction unit 11 gets or extracts WTP-PDUs of WAP packets communicated between the radio base station 2 and the WAP server 3. An extraction time is stamped on each extracted WTP-PDU, and the each WTP-PDU is stored in a log storage unit 12 for each four-addresses group. The four-addresses group consists of a sender's IP address, a receiver's IP address, a sender's port number and a receiver's port number. These extracting operations are executed on real time in the online state.

A state-transition specification database 16 stores a state-transition specification data that defines, the cause-and-effect relationship between the WTP-PDUs and the state of the WTP layer, the primitive between the WTP layer and the WSP layer, and the state of the WSP layer, based on the specification of WAP specification.

A state-transition analysis unit 13 consists of a WTP analysis unit 131 and a WSP analysis unit 132. This state-transition analysis unit 13 analyzes the WTP-PDUs taken out from the log storage unit 12. These analysis operations are executed on batch in the offline state.

The WTP analysis unit 131 analyzes a cause-and effort relationship with WTP-PDUs, states of a WTP layer, and primitives between the WTP layer and the WSP layer. Also, the WTP analysis unit 131 constitutes one transaction that consists of a plurality of WTP-PDUs. The transaction is identified by the four-addresses group of each WTP-PDU and a TID. The WTP analysis unit 131 estimates state-transitions of the WTP layer and the WSP layer, to the apparatus that received one WTP-PDU and subsequently sent other WTP-PDU, for each pair of a sender and a receiver, by using the state-transition specification database 16. The state-transition includes a change in the state of the WTP layer and in the state of the WSP layer, and a change in the sequence of primitives between the WTP layer and the WSP layer. These primitives are sent to the WSP analysis unit 132. Furthermore, the WTP analysis unit 131 estimates the state-transition in the apparatus that sent the one WTP-PDU in an initial state, and the state-transition in the apparatus that sent or received the one WTP-PDU, when a predetermined time-out is generated.

The WSP analysis unit 132 estimates the state of the WSP layer, by using the state-transition specification database 16, based on the primitive received from the WTP analysis unit 131.

A statistical-information storage unit 15 has a session-management table with respect to WSP, a transaction-management table with respect to WTP, a WTP statistical-information table and a WSP statistical-information table, for each four-addresses group.

A display unit 14 displays, in response to the operator's command, contents of the session-management table, the transaction-management table, the WTP statistical-information table and the WSP statistical-information table, stored in the statistical-information storage unit 15. In particular, the states and the primitives of the WTP layer and the WSP layer are displayed in a time-series list. The viewings are realized by GUI (Graphic User Interface).

Figure 3:
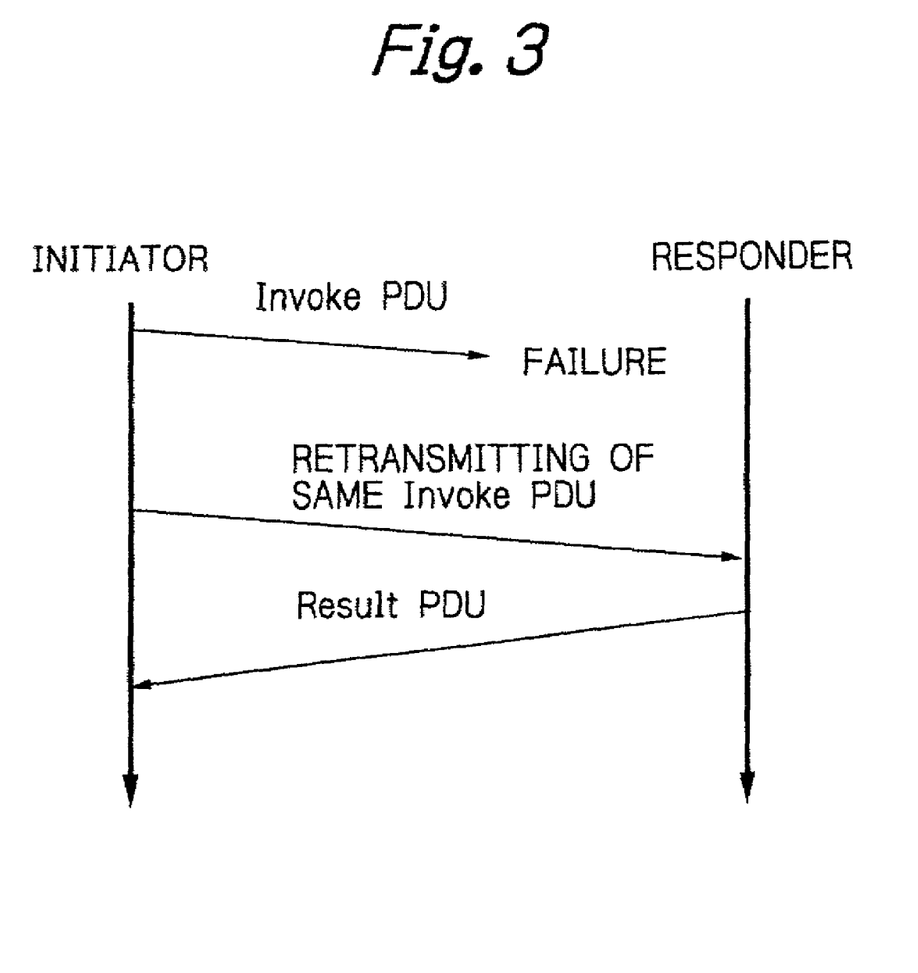
FIG. 3 shows a retransmission sequence of a WTP layer.

FIG. 3 shows a retransmission sequence of the WTP layer. For example, in a case that an Invoke PDU sent from an initiator's WTP layer is not received by a responder's WTP layer, that is, the initiator's WTP layer does not receive an Ack PDU or a Result PDU, the initiator's WTP layer resends the Invoke PDU. In this case, it should be noted that although the initiator's WTP layer sends at least one WTP-PDUs, the number of transaction is one.

Figure 4:
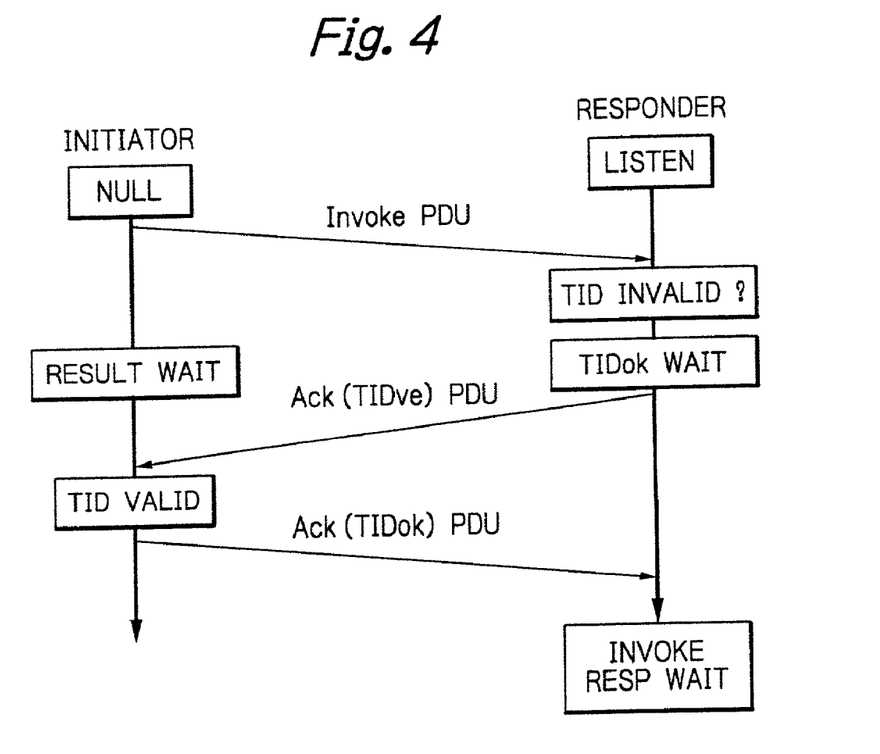
FIG. 4 shows a check sequence of a TID (transaction identifier) of the WTP layer.

FIG. 4 shows a check sequence of TID of the WTP layer. In this sequence, the duplication of TID of the same Invoke PDU is checked so that the initiator's WTP layer never sends the same Invoke PDU to the responder's WTP layer a plurality of times. This check of the TID is executed by sending form the responder's WTP layer an Ack PDU with TIDve (TID verification) to the initiator's WTP layer. In a case that the TID is valid, the initiator's WTP layer sends an Ack PDU with TIDok (TID O.K.) to the responder's WTP layer.

Figure 5:
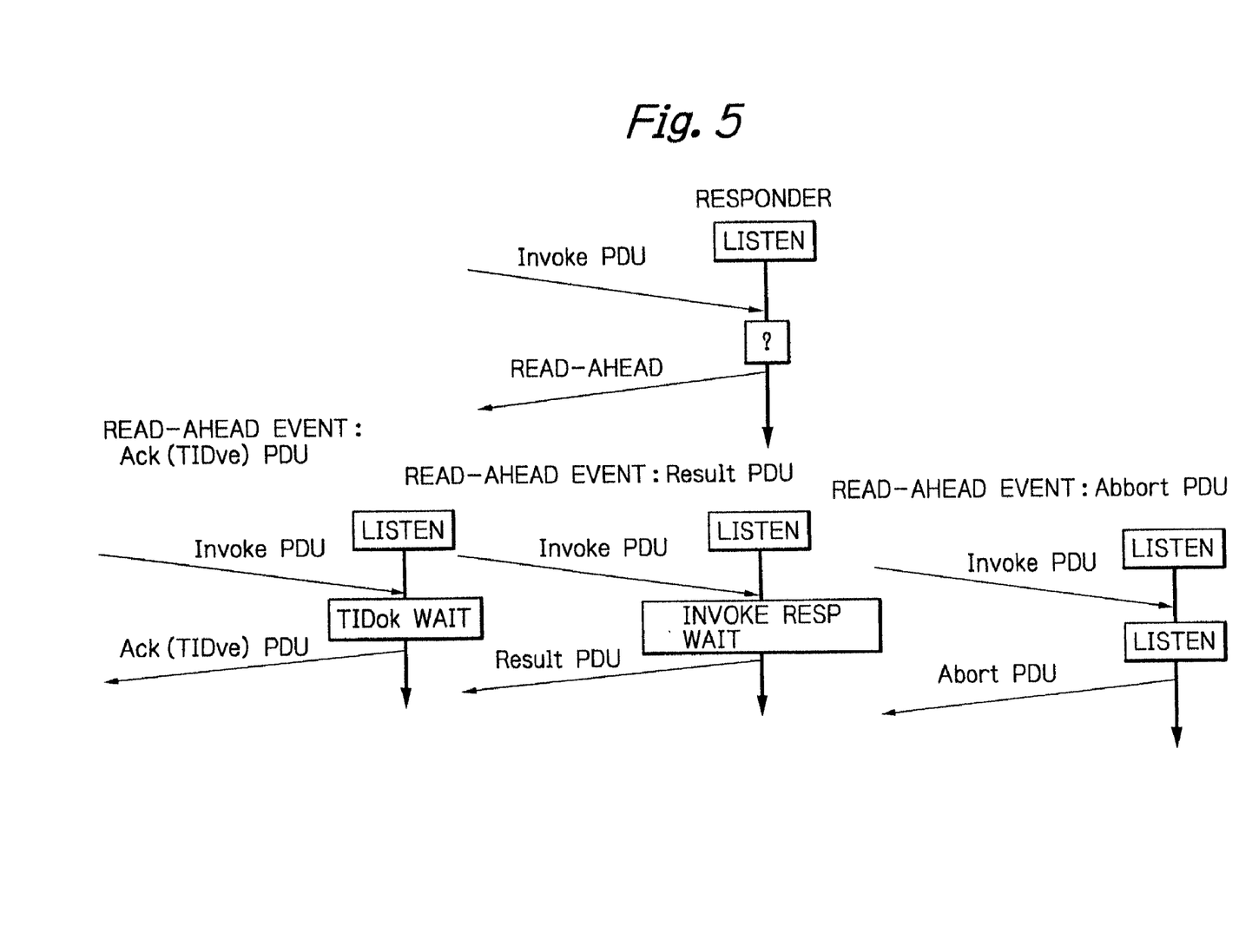
FIG. 5 shows a read-ahead sequence of a responder's WTP layer according to the present invention.

FIG. 5 shows a read-ahead sequence of the responder's WTP layer according to the present invention. If the WAP analyzer extracted an Invoke PDU while the responder's WTP layer is in a LISTEN state, it is impossible to know whether the changed state of this responder's WTP layer is in a TIDok WAIT state, in an INVOKE RESP WAIT state or in a LISTEN state. The state of the responder's WTP layer will be determined by a PDU sent thereafter from the responder's WTP layer. Namely, it will be noted as the TIDok WAIT state when an Ack(TIDve) PDU is sent, as the INVOKE RESP WAIT state when a Result PDU is sent, and as the LISTEN state when an Abort PDU is sent.

Figure 6:
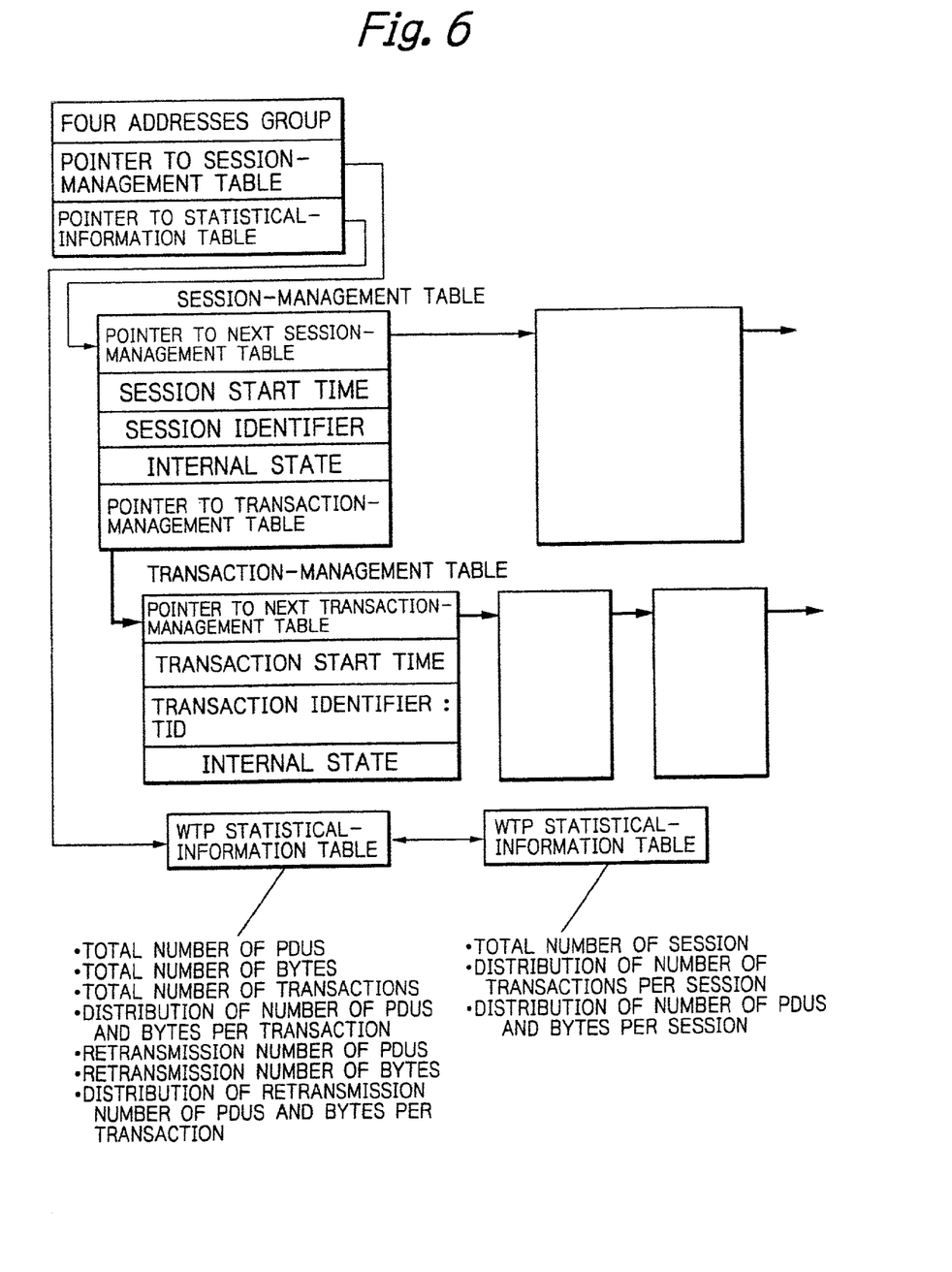
FIG. 6 shows a data-structure stored in a statistics information storage unit according to the present invention.

FIG. 6 shows a data-structure in the statistical-information storage unit 15 according to the present invention. In this unit 15, each table is prepared for each four-addresses group. A session-management table includes data indicating a session start time, a session identifier and a present internal state of the WSP layer. This session-management table also includes a pointer for the next session-management table and a pointer for a transaction-management table to associate the WSP layer's information the WTP layer's information. This transaction-management table include data indicating a transaction start time, a TID and the present internal state of the WTP layer. The unit 15 further has a WTP statistical-information table and a WSP statistical-information table, for each four-addresses group.

Followings are the WTP statistical-information table and the WSP statistical-information table.

| WTP statistical-information table | |
|---|---|
| Item | Number |
| Total number of PDUs | |
| Total number of Bytes | |
| Total number of transactions | |
| Number of PDUs per transaction (1~5) | |
| Number of PDUs per transaction (6~10) | |
| Number of PDUs per transaction (11~15) | |
| ................ | |
| Number of Bytes per transaction (1~20) | |
| Number of Bytes per transaction (21~40) | |
| Number of Bytes per transaction (41~60) | |
| ................ | |
| Total retransmission number of PDUs | |
| Total retransmission number of Bytes | |
| Retransmission number of PDUs per transaction (1~5) | |
| Retransmission number of PDUs per transaction (6~10) | |
| Retransmission number of PDUs per transaction (11~15) | |
| ................ | |
| Retransmission number of Bytes per transaction (1~20) | |
| Retransmission number of Bytes per transaction (21~40) | |
| Retransmission number of Bytes per transaction (41~60) | |
| ................ | |

| WSP statistical-information table | |
|---|---|
| Item | Number |
| Total number of sessions | |
| Number of transactions per session (1~5) | |
| Number of transactions per session (6~10) | |
| Number of transactions per session (11~15) | |
| ................ | |
| Number of PDUs per session (1~20) | |
| Number of PDUs per session (21~40) | |
| Number of PDUs per session (41~60) | |
| ................ | |
| Number of Bytes per session (1~50) | |
| Number of Bytes per session (51~100) | |
| Number of Bytes per session (101~150) | |
| ................ | |

These information is statistically displayed on the display unit 14. Furthermore, the display unit 14 displays an average number of PDUs per transaction, an average number of bytes per transaction, an average number of retransmission PDUs per transaction, an average number of retransmission bytes per transaction, an average number of transactions per session, an average number of PDUs per session, and an average number of bytes per session.

Figure 7:
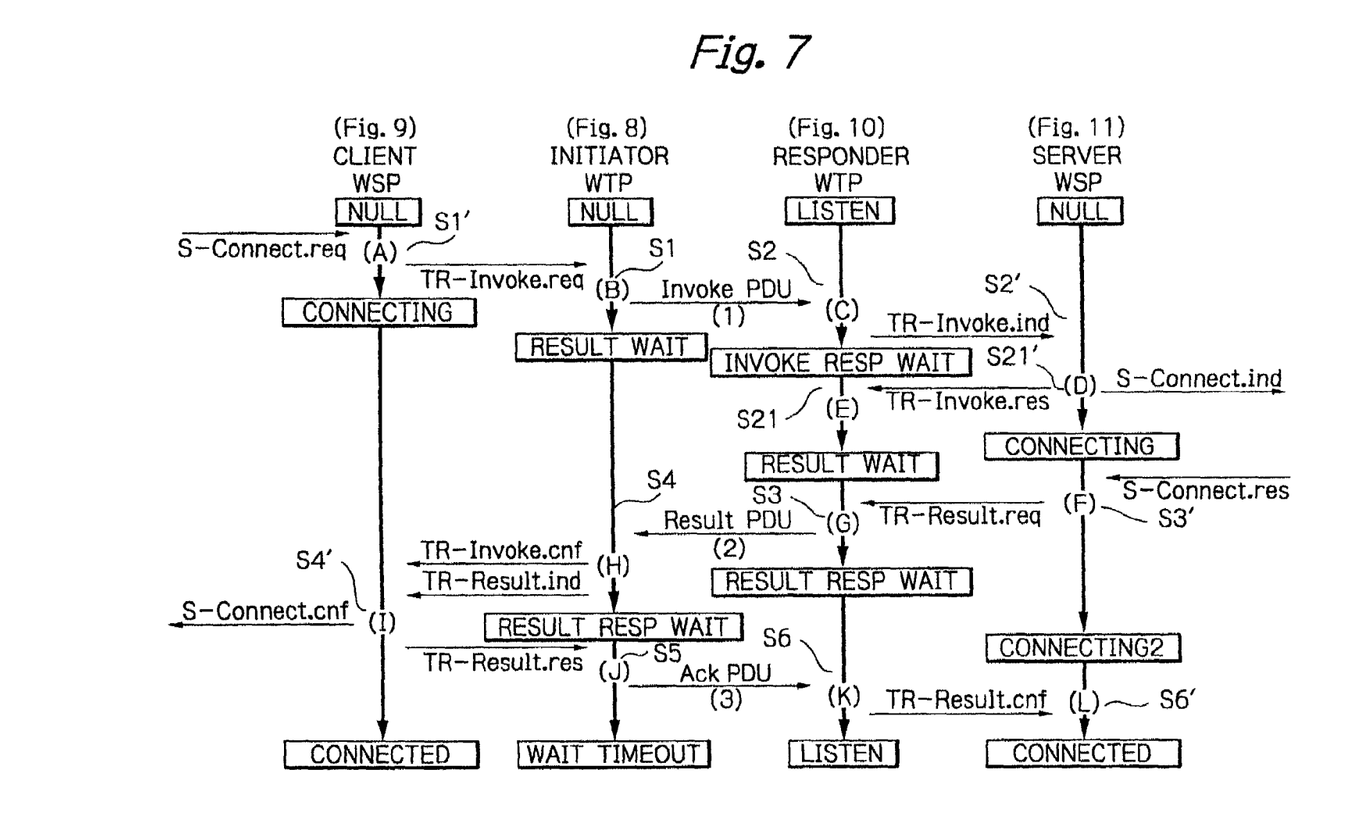
FIG. 7 shows a sequence of states and primitives estimated by the WAP analyzer of the present invention.
Figure 8:
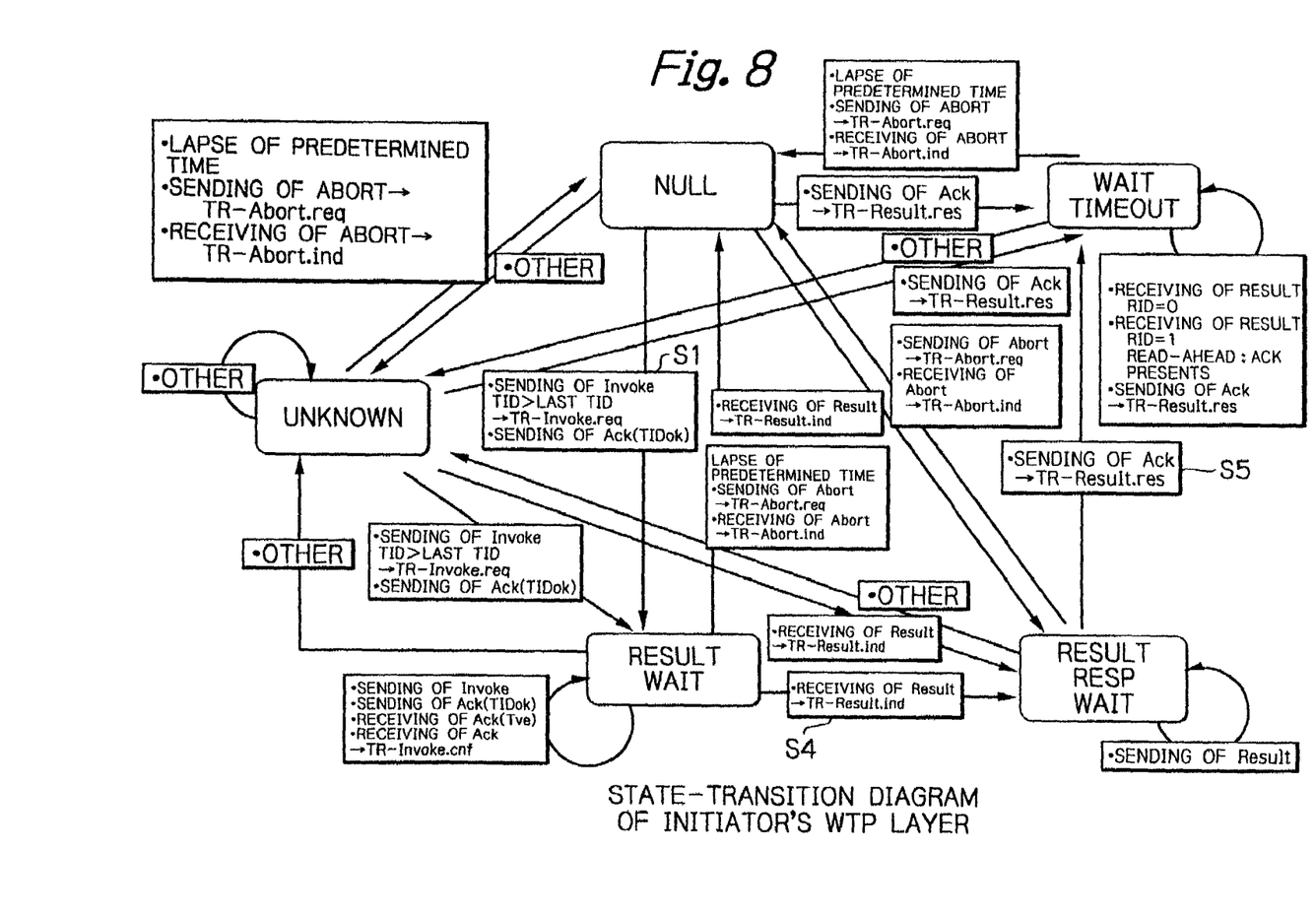
FIG. 8 shows a state-transition table of an initiator's WTP layer stored in a state-transition specification database.
Figure 9:
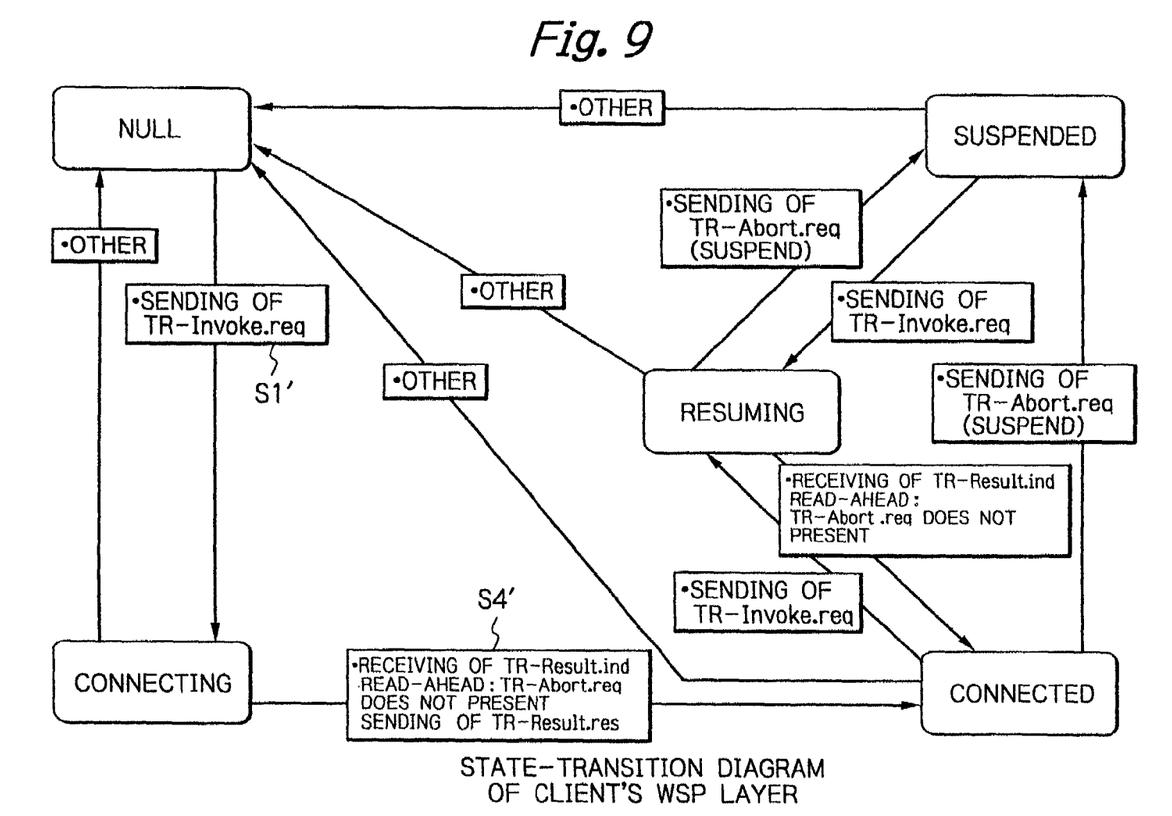
FIG. 9 shows a state-transition table of a client's WSP layer stored in the state-transition specification database.
Figure 10:
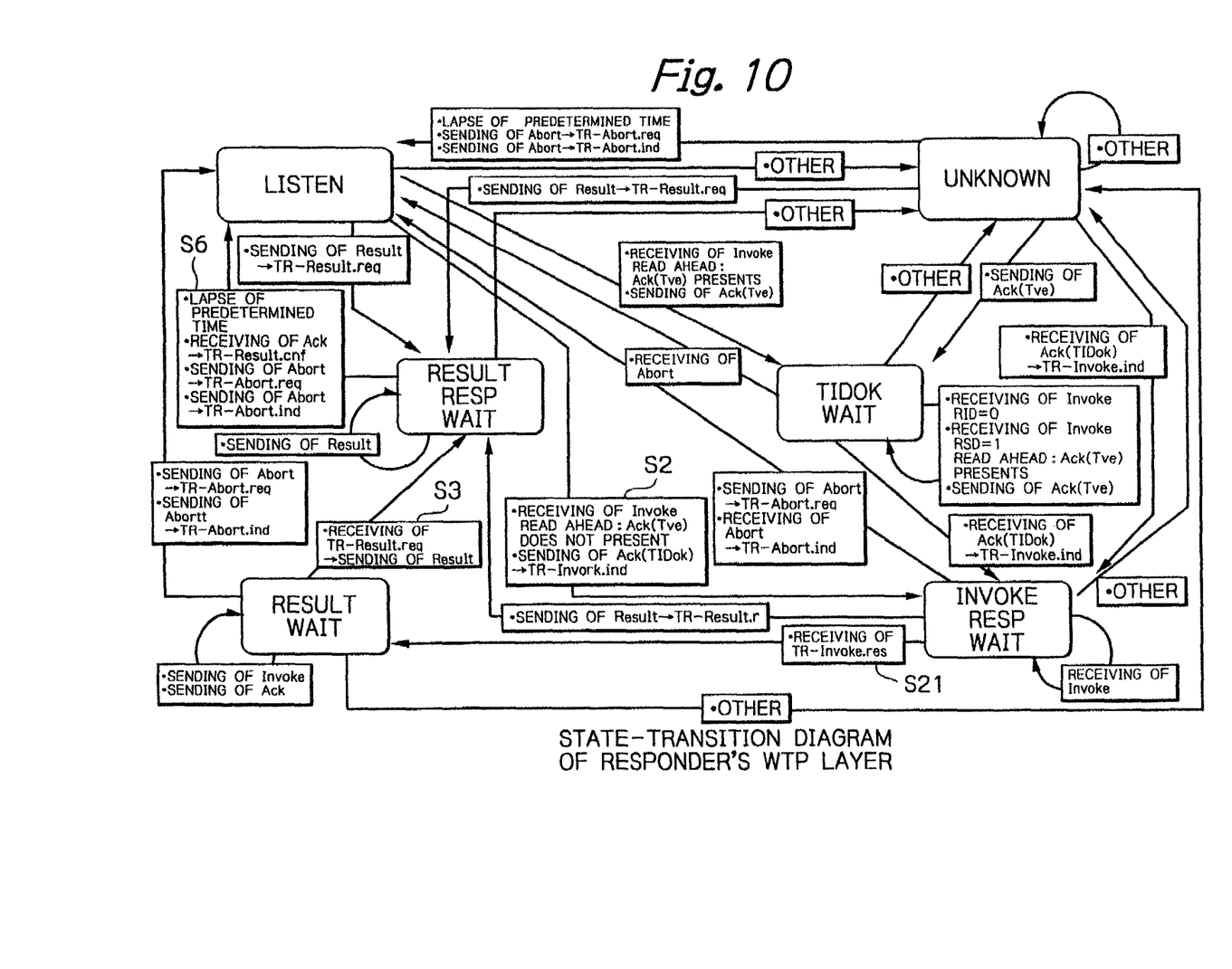
FIG. 10 shows a state-transition table of a responder's WTP layer stored in the state-transition specification database.
Figure 11:
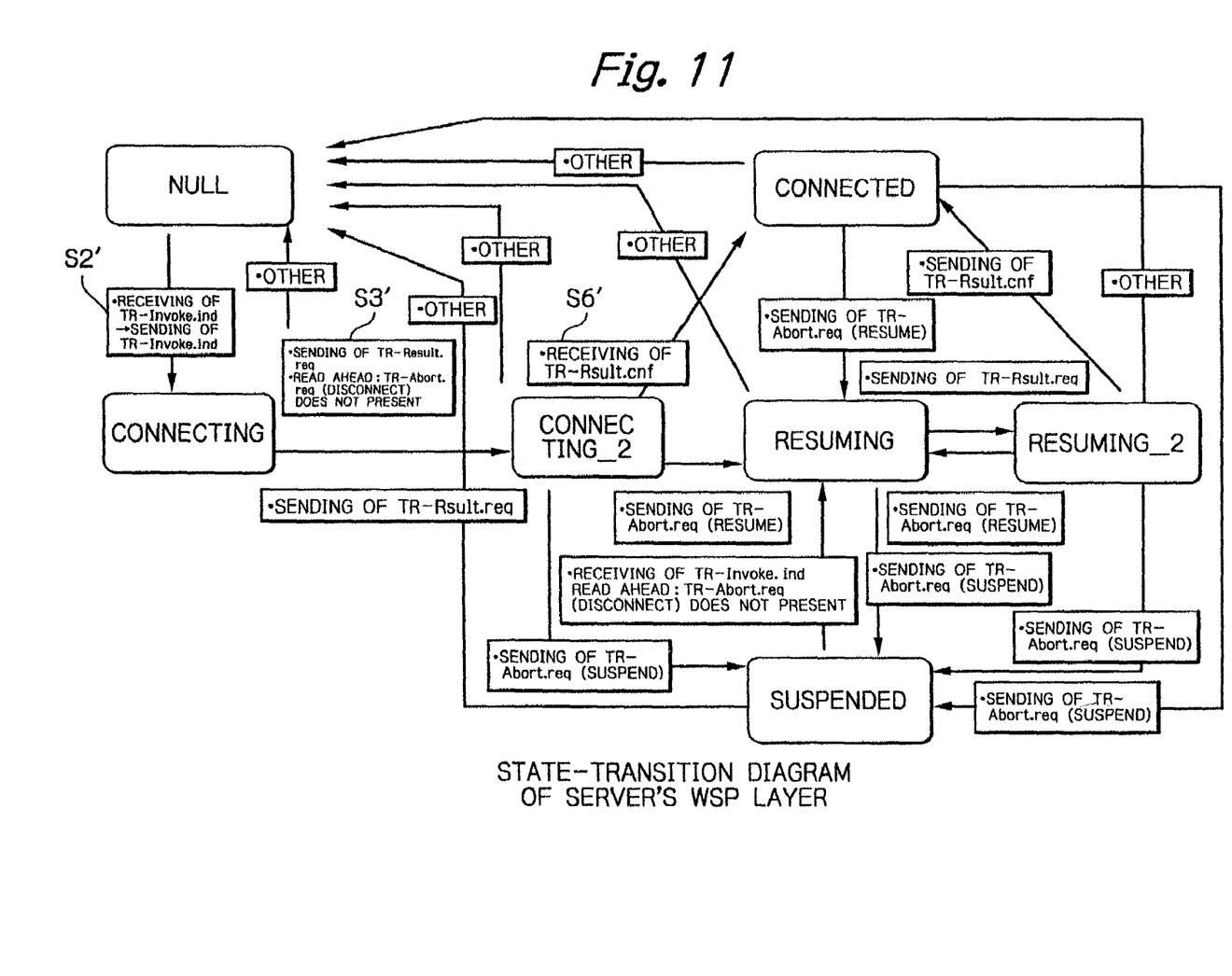
FIG. 11 shows a state-transition table of a server's WSP layer stored in the state-transition specification database.

FIG. 7 shows a sequence of states and primitives estimated by the WAP analyzer of the present invention, FIG. 8 shows a state-transition diagram of the initiator's WTP layer, FIG. 9 shows a state-transition diagram of the client's WSP layer, FIG. 10 shows a state-transition diagram of the responder's WTP layer, and FIG. 11 shows a state-transition diagram of the server's WSP layer.

The state-transition specification database 16 stores a table data based on each state-transition diagram. Since the state-transition diagram completely adheres to the WAP standards, the states and the primitives will be described in detail.

Hereinafter, the sequence shown in FIG. 7 will be described with reference to the state-transition diagrams of FIGS. 8–11.

Initially, the client's WSP layer is in a NULL state, the initiator's WTP layer is in a NULL state, the responder's WTP layer is in a LISTEN state, and the server's WSP layer is in a NULL state.

(1) First, assuming that the WAP analyzer extracts an Invoke PDU. At this time, it is estimated that the initiator's WTP layer receives a TR-Invoke.req from the WSP layer and changes its state from the NULL state to a RESULT WAIT state (see S1 of FIGS. 7 and 8). Then, it is estimated that the client's WSP layer which would send the TR-Invoke.req receives a S-Connect.req from an application layer and changes its state from the NULL state to a CONNECTING state (see S1' of FIGS. 7 and 9).

(2) Next, assuming that the WAP analyzer extracts a Result PDU. At this time, it is estimated that the responder's WTP layer which has received the Invoke PDU sends a TR-Invoke.ind to the WSP layer and changes its state from the LISTEN state to an INVOKE RESP WAIT state (see S2 of FIGS. 7 and 10). As aforementioned with reference to FIG. 5, since the Result PDU is generated in response to the Invoke PDU, the responder's WTP layer is not in a state other than the INVOKE RESP WAIT state. This estimation is achieved by the read-ahead sequence mentioned above. Then, it is estimated that the server's WSP layer which would receive the TR-Invoke.ind sends a S-Connect.ind to an application layer, sends a TR-Invoke.res to the WTP layer, and changes its state from the NULL state to a CONNECTING state (see S2' of FIGS. 7 and 11).

Whereas, it is estimated that the responder's WTP layer which would receive the TR-Invoke.res changes its state from the INVOKE RESP WAIT state to a RESULT state (see S21 of FIGS. 7 and 10).

Furthermore, it is estimated that the server's WSP layer under the CONNECTING state receives a S-Connect.res from the application layer, and sends a TR-Result.req to the responder's WTP layer. Then, the server's WSP layer cannot estimate a following transition state. However, when the server's WSP layer receives a TR-Result.cnf thereafter, it can be estimated that the former state of this server's WSP layer was a CONNECTING_2 state.

Then, it is estimated that the responder's WTP layer which would receive the TR-Result.req sends the Result PDU to the initiator's WTP layer, and changes its state from the RESULT WAIT state to a RESULT RESP WAIT state (see S3 of FIGS. 7 and 10).

(3) Assuming that the WAP analyzer extracts an Ack PDU. At this time, it is estimated that the initiator's WTP layer which would receive the Result PDU sends a TR-Result.ind to the client's WSP layer, and changes its state from the RESULT WAIT state to a RESULT RESP WAIT state (see S4 of FIGS. 7 and 8).

Whereas, it is estimated that the client's WSP layer which would receive the TR-Result.ind under the CONNRCTING state sends a S-Connect.cnf to the application layer, sends a TR-Result.res to the initiator's WTP layer, and changes its state from the CONNECTING state to a CONNECTED state (see S4' of FIGS. 7 and 9).

Whereas, it is estimated that the initiator's WTP layer which would receive the TR-Result.res under the RESULT RESP WAIT state sends the Ack PDU to the responder's WTP layer, and changes its state from the RESULT RESP WAIT state to a WAIT TIMEOUT state (see S5 of FIGS. 7 and 8).

Whereas, it is estimated that the responder's WTP layer which would receive the Ack PDU under the RESULT RESP WAIT state sends a TR-Result.cnf to the server's WSP layer, and changes its state from the RESULT RESP WAIT state to the LISTEN state (see S6 of FIGS. 7 and 10). Furthermore, it is estimated that the former state of the server's WSP layer which would receive the TR-Result.cnf is the CONNECTING_2 state by the read-ahead sequence, and thereafter the server's WSP layer changes its state from the CONNECTING_2 state to a CONNECTED state (see S6' of FIGS. 7 and 11).

Although not shown in FIG. 7, when the Ack PDU is not extracted within a certain period of time, that is, when a predetermined time-out is generated, it can be estimated that the initiator's WTP layer receives no TR-Result.res from the client's WSP layer.

In the aforementioned embodiments, the sequence of the state-transition for the connection establishment PDUs between the client and the server is estimated. By using the similar way, the sequence of the state-transition for other PDUs can also be estimated.

As mentioned above in detail, the WAP analyzer according to the present invention can estimate the state-transition sequence based upon the state-transition specification of WAP. Furthermore, the WAP analyzer according to the present invention can analyze the transmission state based on the relationship between at least one transactions and one session.

The WAP analyzer of the present invention is very useful for the mobile data-communication service in which a transmission state will change with a lapse of time, and the operator can easily find the cause of an abnormal transmission state at the WTP layer and the WSP layer levels.

Many widely different embodiments of the present invention may be constructed without departing from the spirit and scope of the present invention. It should be understood that the present invention is not limited to the specific embodiments described in the specification, except as defined in the appended claims.

What is claimed is:

1. A WAP (Wireless Application Protocol) analyzer located on a transmission line between communication apparatuses using WAP, a WAP packet includes at least one WTP-PDUs (Wireless Transaction Protocol-Protocol Data Unit), said WAP analyzer comprising:
   database for storing state-transition specification data that define a state-transition with a cause-and-effect relationship between WTP-PDUs, states of a WTP layer, primitives between said WTP layer and WSP (Wireless Session Protocol) layer, and states of said WSP layer, based on WAP specification;
   means for extracting said WTP-PDUs from said WAP packets; and
   means for estimating said state-transition of said WTP layer and said WSP layer, to said apparatus that received one of said WTP-PDUs and subsequently sent other of said WTP-PDUs, for each pair of a sender and a receiver; and
   means for displaying said state-transition.

2. A WAP analyzer as claimed in claim 1, wherein said estimating means estimates said state-transition in said apparatus that sent said one WTP-PDU in an initial state.

3. A WAP analyzer as claimed in claim 2, wherein said estimating means estimates said state-transition in said apparatus that sent or received said one WTP-PDU, when a predetermined time-out is generated.

4. A WAP analyzer as claimed in claim 1, wherein said displaying means displays said state-transition in time series.

5. A WAP analyzer as claimed in claim 1, wherein said WAP analyzer further comprises means for storing a log of said WTP-PDUs extracted on real time in an online state by said extracting means, and wherein said estimating means processes in an offline state using a plurality of WTP-PDUs stored in said log storing means.

6. A WAP analyzer as claimed in claim 1, wherein said WAP analyzer further comprises means for storing a statistical-information including a WTP statistical-information table and a WSP statistical-information table for each pair of send sender and said receiver, and wherein said estimating means for incrementing the number of item of WTP statistical-information table and of WSP statistical-information table, in a case that said WAP packets corresponds to said item.

7. A WAP analyzer as claimed in claim 6, wherein items of said WTP statistical-information table include the number of PDUs, the number of bytes, the number of transactions, the distributed number of PDUs per transaction, the number of retransmission PDUs per transaction, the number of retransmission bytes, the number of retransmission PDUs per transaction and the distributed number of retransmission bytes per transaction, and wherein items of said WSP statistical-information table include the number of sessions, the distributed number of transactions per session, the number of PDUs per session, and the distributed number of bytes per session.

8. A WAP analyzer as claimed in claim 7, wherein said displaying means displays said items and the numbers of said items in said WTP statistical-information table and said WSP statistical-information table.

9. A WAP analyzer as claimed in claim 8, wherein said displaying means displays an average number of PDUs per transaction, an average number of bytes per transaction, an average number of retransmission PDUs per transaction, an average number of retransmission bytes per transaction, an average number of transactions per session, an average number of PDUs per session, and an average number of bytes per session.

* * * * *